United States Patent [19]

Peiffer et al.

[11] Patent Number: 4,460,758
[45] Date of Patent: Jul. 17, 1984

[54] DRAG REDUCTION AGENTS FOR AQUEOUS SALT SOLUTIONS

[75] Inventors: Dennis G. Peiffer, East Brunswick; Robert D. Lundberg; Ralph M. Kowalik, both of Bridgewater, all of N.J.; S. Richard Turner, Rochester, N.Y.

[73] Assignee: Exxon Research and Engineering Co., Florham Park, N.J.

[21] Appl. No.: 547,910

[22] Filed: Nov. 2, 1983

[51] Int. Cl.$^3$ ............................................. C08F 20/00
[52] U.S. Cl. ............................... 526/287; 526/292.95; 526/240; 524/547
[58] Field of Search .................... 526/240, 287, 292.95; 524/547

[56] References Cited

U.S. PATENT DOCUMENTS 3,123,589  3/1964  Vanderkooi et al. ............... 526/240
4,075,183  2/1978  Kawakami et al. ................. 526/287

Primary Examiner—Paul R. Michl
Assistant Examiner—Alex H. Walker
Attorney, Agent, or Firm—Richard E. Nanfeldt

[57] ABSTRACT

The present invention relates to improved drag reduction agents for aqueous solutions which comprises a polymeric complex which is a terpolymer of acrylamide/metal styrene sulfonate/methacrylamidopropyltrimethyl ammonium chloride.

The metal styrene sulfonate is an anionic monomer, while MAPTAC is cationically charged. These acrylamide-based polyampholytes have approximately 1 to about 50 mole % of the anionic monomer and approximately 1 to about 50 mole % of the cationic moiety present within the macromolecular structure. These groups are not necessarily present in an equimolar charge ratio. The excess undissociated charge allows for facile dispensability or solubility of the polyampholytes into fresh water.

12 Claims, 1 Drawing Figure

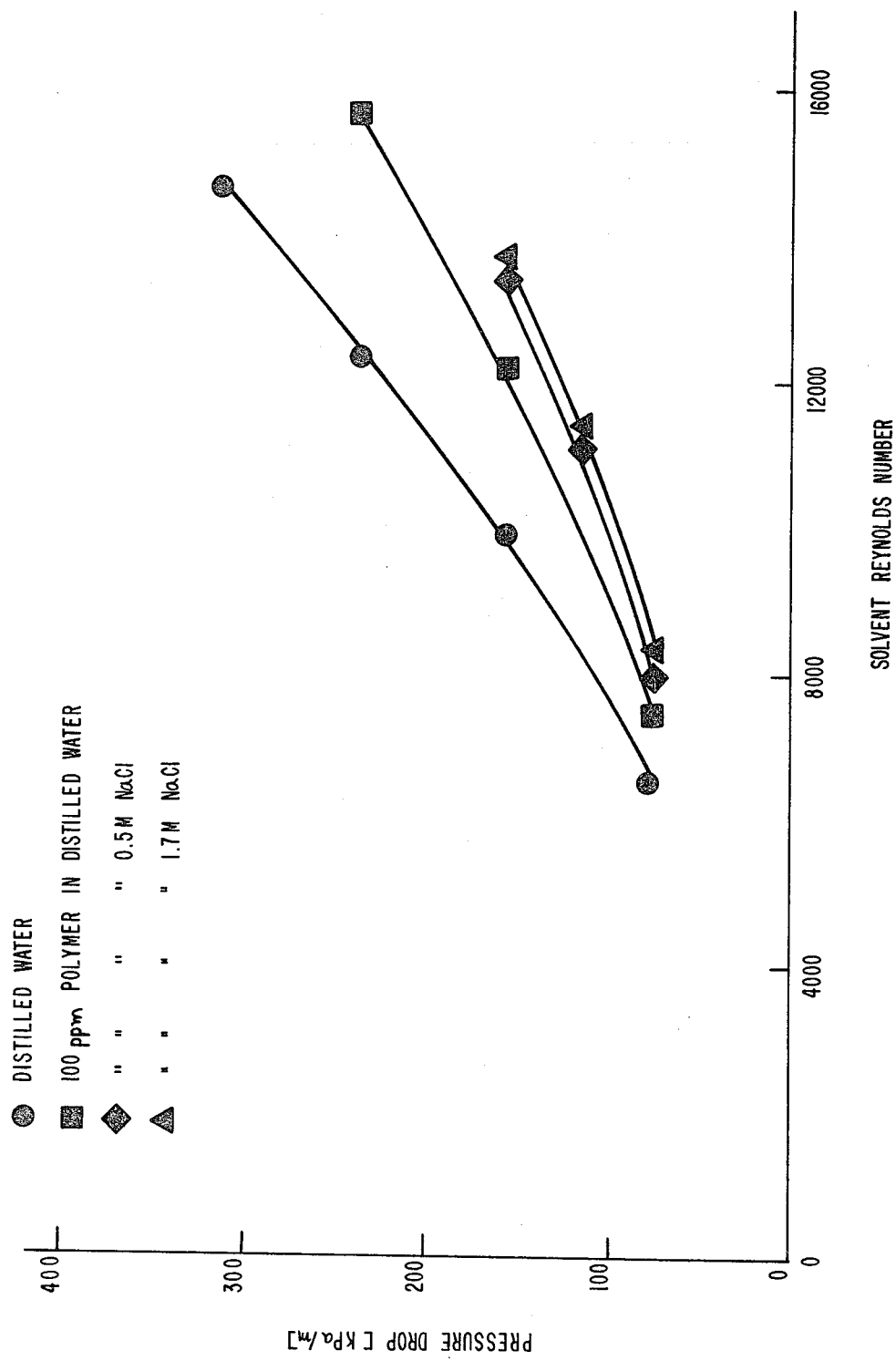

DRAG REDUCTION AGENTS FOR AQUEOUS SALT SOLUTIONS

FIELD OF THE INVENTION

The present invention relates to a family of novel and efficient drag reduction agents for a variety of aqueous solutions which comprise a family of polymeric complexes (i.e., polyampholytes) which are terpolymers of acrylamide/metal styrene sulfonate/methacrylamidopropyltrimethylammonium chloride (MAPTAC).

The metal styrene sulfonate is an anionic monomer, while MAPTAC is cationically charged. These acrylamide-based polyampholytes have approximately 1 to about 50 mole % of the anionic monomer and approximately 1 to about 50 mole % of the cationic moiety present within the macromolecular structure. These groups are not necessarily present in an equimolar charge ratio. The excess undissociated charge allows for facile dispensability or solubility of the polyampholytes into fresh water.

BACKGROUND OF THE INVENTION

To flow liquids in pipes, energy must be expended to overcome frictional losses. This energy is extracted from the liquid pressure, which decreases along the pipe in the direction of flow. For the fixed pipe diameter, these pressure drops increase with increasing flow rate until a maximum is reached when the pressure drop along the pipe equals the supply pressure at the beginning of the pipe. When flow in the pipe is turbulent (flow Reynolds number=mean fluid velocity×pipe diameter÷fluid kinematic viscosity greater than about 2000) this maximum flow rate can be increased by the addition of small amounts of certain high molecular weight linear polymers to the liquid. These polymers interact with the turbulent flow processes and reduce frictional pressure losses such that the pressure drop for a given flow rate is less, or the maximum flow rate for a given pressure drop is larger. This phenomenon is commonly called drag reduction. It has been used in commercial oil pipelines, fire hoses and storm sewers to increase the flow capacities of existing systems. It can also be used to reduce supply pressures, pumping costs, and/or pipe diameters for given flow capacities.

High molecular weight water soluble polymers such as polyethylene oxide (PEO, polyacrylamide (PAM) and partially hydrolyzed polyacrylamide (HPAM) have been demonstrated to reduce drag in turbulent flow of aqueous liquid.

The instant invention discloses new efficient drag reduction agents in aqueous liquids which are a novel class of terpolymers of acrylamide/metal styrene sulfonate/methacrylamidopropyltrimethylammonium chloride.

The present invention relates to improved drag reduction agents for aqueous solutions which comprise a polymeric complex which is a terpolymer of acrylamide/metal styrene sulfonate/methacrylamidopropyltrimethyl ammonium chloride.

We note that high molecular weight polymeric materials in general, are considered useful as drag reduction agents when dissolved in an appropriate solvent system. The major reason for this reduction in fluid drag is due in large part to the very large dimensions of the individual polymer chain as compared to the dimension of the single solvent molecules. Any increase in size of the polymer chain will produce a corresponding enhancement in the drag reduction. This effect is maximized, when the polymer is dissolved in a "good" solvent. Therefore, in general, a hydrocarbon soluble polymer is useful in hydrocarbon solvents while a water soluble polymer is appropriate in aqueous systems. With regard to aqueous systems, polyelectrolytes are very useful and the most commonly used materials; however, the solution properties (for example, drag reduction) of these materials begin to deteriorate as low molecular additives (i.e., acids, bases or salts) are dissolved in the solution. These additives screen the charges that are fixed along the chain backbone which results in a decrease in the dimensions of the polymer molecule. The drag reduction diminishes as long as the chain continues to shrink.

The instant invention discloses that polymeric complexes, composed of cationic, anionic and neutral monomeric units, can be useful as drag reduction agents for aqueous solution systems.

The former two moieties need not be present in an equimolar amount. More importantly, these polymeric materials possess higher viscosity in acid, base or salt solutions than in the corresponding fresh water system. Even more interesting is that these polymeric materials show a corresponding viscosity enhancement as the concentration of the dissolved acid, base or salt is increased. These viscosity results are unexpected since the general tendency of homogeneously charged macromolecules in these types of aqueous solutions shows a marked decrease in thickening efficiency.

Typical water soluble monomers incorporated into the terpolymers that are envisioned in the present invention are listed as follows:

Anionic: 2-acrylamido-2-methylpropane sulfonic acid, sodium styrene sulfonate, (meth)acrylic acid, 2-sulfoethylmethacrylate, and the like.

Cationic: methacrylamidopropyltrimethylammonium chloride, dimethyldiallylammonium chloride, diethyldiallylammonium chloride, 2-methacryloxy-2-ethyltrimethylammonium chloride, trimethylmethacryloxyethylammonium methosulfate, 2-acrylamido-2-methylpropyltrimethylammonium chloride, vinylbenzyltrimethylammonium chloride, and the like.

Nonionic: (N,N-dimethyl)acrylamide, hydroxyethyl(meth)acrylate, alkyl substituted acrylamides, (meth)acrylates, N-vinyllactones (e.g., n-vinyl-2-pyrrolidone), and the like.

These monomers possess the appropriate water solubility for polymerization to take place.

Salamone et al, of the University of Lowell (Massachusetts), have investigated amphrolytic polymers. They have studied the solution properties of divinylic cationic-anionic monomer pairs and also cationic-anionic monomer pairs with a neutral comonomer. This latter group of materials contains styrene as the neutral comonomer (J. Polym. Sci. Al, 18, 2983 [1980]), which can be incorporated into the ampholytic macromolecular structure through both solution or emulsion polymerization schemes. Apparently, other neutral vinylic monomers (i.e., acrylamide) were also polymerized (Gordon Research Conference—1981); but as of the present time, reports of this work have not been published in the scientific literature. However, in all of Salamone's work, detailed descriptions of his synthesis is reported. In all instances, the polymerization of the anionic-cationic monomeric species occurred via an "ion-pair comonomers that have no nonpolymerizable counterions present" (J. Polym. Sci.—Letters, 15, 487 [1977]). Apparently the physical and chemical properties of these ion-pair comonomers are different than the individual ions (J. Polym. Sci.—Letters, 15, 487 [1977]). Excess dissociable changes are not present within these polymeric materials.

The instant invention discloses that these terpolymer complexes can be useful as drag reduction agents for multicomponent aqueous salt solutions, e.g., well control and workover fluids, blood and the like. In the latter fluid, addition of the terpolymer will enhance the blood flow rate through the circulation system of the living species (animal or homosapiens). In most instances, this would have a beneficial effect on the organism, such as enhancing the rate blood can carry oxygen, medicines, nutrients and the like to an organ. Similar enhancements would be observed with regard to fluid circulation in plants.

SUMMARY OF THE INVENTION

The present invention relates to improved drag reduction agents for an aqueous solution which can contain high concentrations of acids, bases or salts. The viscosification agents are polymeric complexes, i.e., polyampholytes which are formed by a free radical terpolymerization of acrylamide monomer, sodium styrene sulfonate monomer and methacrylamidopropyltrimethylammonium chloride, wherein the formed water soluble terpolymers have the formula:

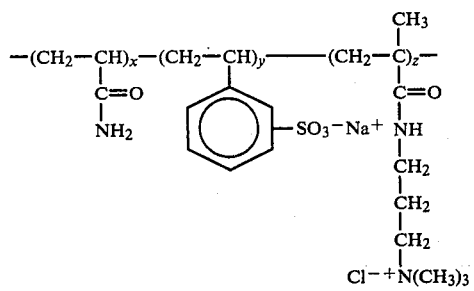

wherein x is about 40 to about 98 mole %, more preferably about 50 to about 95 mole %, and most preferably about 80 to about 90 mole %, y is about 1 to about 50 mole %, more preferably about 2 to about 20 mole %, and most preferably about 5 to about 10 mole %; and z is about 1 to about 50 mole %, more preferably about 2 to about 20 mole %, and most preferably about 5 to about 10 mole %, wherein y and z are less than 60 mole %. These ionic groups are not necessarily present in an equimolar charge ratio, since the excess undissociated charge allows for facile dispensibility of the polyampholyte into fresh water.

GENERAL DESCRIPTION

The instant invention describes a new class of drag reduction agents for aqueous solutions containing dissolved acid, base or salt. These terpolymers are formed by a free radical terpolymerization process in an aqueous medium of an acrylamide monomer, a sodium styrene sulfonate monomer and a methacrylamidopropyltrimethylammonium chloride monomer. The resultant water soluble terpolymer has the formula:

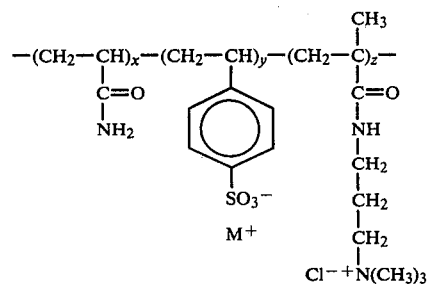

wherein x is about 40 to about 98 mole %, more preferably about 50 to about 95 mole %, and most preferably about 80 to about 90, y is about 1 to about 50 mole %, more preferably about 2 to about 20 mole %, and most preferably about 5 to about 10 mole %, and z is about 1 to about 50 mole %, more preferably about 2 to about 20, and most preferably about 5 to about 10, wherein y and z are less than 60 mole %, and M is an amine or a metal cation selected from the group consisting of aluminum, iron, lead, Groups IA, IIA, IB and IIB of the Periodic Table of Elements.

The molecular weight, as derived from intrinsic viscosities, for the terpolymers of acrylamide/sodium styrene sulfonate/methacrylamidopropyltrimethylammonium chloride is about $1 \times 10^3$ to about $5 \times 10^7$, more preferably about $1 \times 10^4$ to about $2 \times 10^7$ and most preferably about $1 \times 10^5$ to about $1 \times 10^7$. The means for determining the molecular weights of the water soluble terpolymers from the viscosity of solutions of the terpolymers comprises the initial isolation of the water soluble terpolymers, purification and redissolving the terpolymers in water to give solutions with known concentrations. The flow times of the solutions and the pure solvent were measured in a standard Ubbelholde viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well-known Mark-Houwink relationship.

The water soluble terpolymers of acrylamide/sodium styrene sulfonate/methacrylamidopropyltrimethyl ammonium chloride are formed by a free radical terpolymerization in an aqueous medium which comprises the steps of forming a reaction solution of acrylamide monomer, sodium styrene sulfonate monomer and methacrylamidopropyltrimethylammonium chloride monomer (50 wt. % solution in water) in distilled water, wherein the total monomer concentration is about 1 to about 40 grams of total monomer per 100 grams of water, more preferably about 5 to about 30, and most preferably about 10 to about 20; purging the reaction solution with nitrogen; adding sufficient acid to the reaction solution to adjust the pH of the reaction solution to about 4.5 to about 5.0; heating the reaction solution to at least 55° C. while maintaining the nitrogen purge; adding sufficient free radical initiator to the reaction solution at 55° C. to initiate terpolymerization of the acrylamide monomer, the sodium styrene sulfonate monomer, and the methacrylamidopropyltrimethyl ammonium chloride monomer; terpolymerizing said monomers of acrylamide, sodium styrene sulfonate and methacrylamidopropyltrimethylammonium chloride at a sufficient temperature and for a sufficient period of time to form said water soluble terpolymer; and recovering said water soluble terpolymer from said reaction solution.

The total concentration of monomers in the water is about 1 to about 40 grams of total monomer per 100 grams of water, more preferably about 5 to about 30, and most preferably about 10 to about 20. Terpolymerization of the acrylamide monomer, sodium styrene sulfonate monomer, and methacrylamidopropyltrimethylammonium chloride monomer is effected at a temperature of about 30 to about 90, more preferably at about 40 to about 70, and most preferably at about 50 to about 60 for a period of time of about 1 to about 24 hours, more preferably about 3 to about 10, and most preferably about 4 to about 8.

A suitable method of recovery of the formed water soluble terpolymer from the aqueous reaction solution comprises precipitation in acetone, methanol ethanol and the like.

Suitable free radical initiators for the free radical terpolymerization of the acrylamide monomers, the sodium styrene sulfonate monomer, and the methacrylamidopropyltrimethyl ammonium chloride monomer are selected from the group consisting of potassium persulfate, ammonium persulfate, benzoyl peroxide, hydrogen peroxide, and azobisisobutyronitrile and the like. The concentration of the free radical initiator is about 0.001 to about 2.0 grams of free radical initiator per 100 grams of total monomer, more preferably about 0.01 to about 1.0 and most preferably about 0.05 to about 0.1.

It should be pointed out that neither the mode of polymerization (solution, suspension, or emulsion polymerization technique and the like), nor the initiation is critical, provided that the method or the products of the initiation step does ot inhibit production of the polyampholyte or chemically modify the initial molecular structure of reacting monomers.

Typical water soluble monomers incorporated into the terpolymers that are envisioned in the present invention are listed as follows:

Anionic: 2-acrylamido-2-methylpropane sulfonic acid, sodium styrene sulfonate, (meth)acrylic acid, 2-sulfoethylmethacrylate, and the like.
Cationic: methacrylamidopropyltrimethylammonium chloride, dimethyldiallylammonium chloride, diethyldiallylammonium chloride, 2-methacryloxy-2-ethyltrimethylammonium chloride, trimethylmethacryloxyethylammonium methosulfate, 2-acrylamido-2-methylpropyltrimethylammonium chloride, vinylbenzyltrimethylammonium chloride, and the like.
Nonionic: (N,N-dimethyl)acrylamide, hydroxyethyl(meth)acrylate, alkyl substituted acrylamides, (meth)acrylates, N-vinyllactones (e.g., n-vinyl-2-pyrrolidone), and the like.

These monomers possess the appropriate water solubility for polymerization to take place.

DESCRIPTION OF THE PREFERRED EMBODIMENTS

The following examples illustrate the present invention, without; however, limiting the same hereto.

EXAMPLE 1

Into a 1-liter, 4-neck flask add:
15.35 g methacrylamidopropyltrimethylammonium chloride (MAPTAC) (50% solution)
40.0 g acrylamide
7.16 g sodium styrene sulfonate
300 ml. distilled water We should emphasize at this time that the anionic and cationic monomers were added to the aqueous phase without attempting to form ion-pair comonomers that do not possess nonpolymerizable counterions. Activated charcoal was added to the MAPTAC monomer solution at a 2 wt. % level, stirred vigorously for 24 hours and filtered through standard filter paper. This solution was used in the subsequent polymerization mixture.

The pH of the solution was adjusted to 4.5 to 5.0 with 20% phosphonic acid solution. The solution was purged with nitrogen gas for 1 hour to remove dissolved oxygen. As the nitrogen gas purging began, the solution was heated to 50° C. At this point, 0.05 g potassium persulfate was added to the solution. After 4 hours, the polymer was precipitated from solution with acetone. Subsequently, the resulting polymer was washed several times with a large excess of acetone and dried in a vacuum oven at 60° C. for 24 hours.

Elemental analysis shows that this polyampholyte or intramolecular complex contains 89.6 mole % acrylamide, 1.6 mole % sodium styrene sulfonate and 8.8 mole % methacrylamidopropyltrimethylammoniumstyrene sulfonate complex.

EXAMPLE 2

A 1% solution of the polyampholyte (described in Example 1) was formed in distilled water and in a 1.7M (molar) sodium chloride solution. The viscosity, as measured via a Brookfield viscometer, was 11.4 cps in the distilled water system, while the viscosity increased to 34.1 cps with the addition of the salt.

This example shows that the polyampholyte can be used to effectively thicken both distilled water and high ionic strength aqueous solutions. Moreover, the marked increase in viscosity in the latter solution confirms that solubilization of the polymer is more complete. These solution characteristics are reflected in our drag reduction experiments, i.e., Example 3.

EXAMPLE 3

Drag reduction was evaluated by flowing aqueous polymer solutions through a 2.13 mm inside diameter stainless steel tube and measuring the resulting frictional pressure drop. All solutions in this example contained 100 ppm (by weight) of the polyampholyte described previously. The solvent was distilled water containing various amounts of NaCl. Flows were generated by loading a pair of stainless steel tanks (1 l. each) with a previously dissolved aqueous polymer solution, pressurizing the tanks with nitrogen gas (300 kPa), and discharging the solution through the tube test section. Pressure drops were measured across a 48 cm straight segment of the tube with a pair of tube wall pressure taps and a differential pressure transmitter. Flow rates were measured by weighing samples of the effluent liquid collected over measured time periods.

Flow rates in the drag reduction experiments ranged from about 10 to 24 g/s; these corresponded to solvent Reynolds numbers from about 6,500 to 16,000 (solvent Reynolds number=mean flow velocity×tube diameter÷solvent kinematic viscosity). Drag reduction was measured by comparing pressure drops of the polymer/xylene solutions with pressure drops of the xylene solvent at equal flow rates. Results were expressed as percent drag reduction which is defined as follows:

Percent Drag Reduction =

$$\left( \frac{\text{Pressure Drop (Solvent)} - \text{Pressure Drop (Solution)}}{\text{Pressure Drop (Solvent)}} \right) \times 100$$

Typical drag reduction results from experiments with the polyampholyte solutions are given in Table I. Additional data relating measured pressure drops to solvent Reynolds numbers are given in FIG. 1.

TABLE I

Drag Reduction Results for Novel Polyampholyte Solutions

| Polymer Concentration | Salt Concentration | % Drag Reduction (Solvent Reynolds Number - 12,000) |
|---|---|---|
| 100 ppm | none | 35 |
| 100 ppm | 0.5M NaCl | 45 |
| 100 ppm | 1.7M NaCl | 48 |

The data indicate that significant drag reduction was observed for all solutions and that drag reduction effectiveness improved with increasing salt concentrations.

Moreover, our data shows that these polymeric materials are effective drag reducers in fresh water.

The high molecular weight polymeric materials used in this study appear to be useful as a particular example of a general phenomena. That is, the presence of monomeric units comprising the broad class of water soluble anionic and cationic moieties within the polymer chain are the necessary requirements for drag reduction in acid, base or salt solutions. A stoichiometric amount of these oppositely charged units is not a requirement for effective drag reduction of these latter solutions. In addition, the acrylamide monomer units present within the terpolymer structure is only one example of many available water soluble or water dispersible monomer structures.

What is claimed is:

1. A terpolymer for use as a drag reducing agent, said terpolymer having the formula:

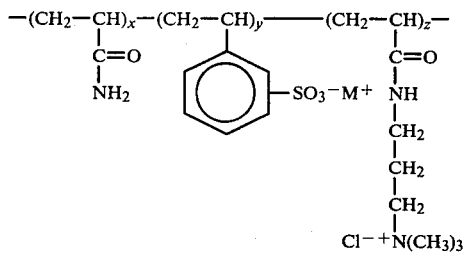

wherein x is about 40 to about 98 mole %, y is about 1 to about 50 mole %, z is about 1 to about 50 mole %, wherein y and z are less than 60 mole %, and M is selected from the group consisting of amines and a metallic cation being selected from the group consisting of lead, iron, aluminum, Groups IA, IIA, IB and IIB of the Periodic Table of Elements.

2. A terpolymer according to claim 1 wherein said terpolymer is water soluble.

3. A terpolymer according to claim 1 wherein M is sodium.

4. A terpolymer according to claim 1 wherein said terpolymer is dissolved in a salt solution at a concentration of about 0.001 to about 20 grams of terpolymer per 100 grams of water, said salt solution having about 0.001 to about 60 grams of salt per 100 grams of said salt solution.

5. A terpolymer according to claim 1 wherein said terpolymer is dissolved in an acid solution at a concentration of about 0.001 to about 20 grams of terpolymer per 100 grams of water, said acid solution having about 0.001 to about 30 grams of acid per 100 grams of said acid solution.

6. A terpolymer according to claim 1 wherein said terpolymer is dissolved in a base solution at a concentration of about 0.001 to about 20 grams of terpolymer per 100 grams of water, said base solution having about 0.001 to about 60 grams of base per 100 grams of said base solution.

7. A terpolymer according to claim 1 wherein said terpolymer possesses a nonstoichiometric amount of anionic and cationic groups.

8. A terpolymer according to claim 1 wherein said terpolymer is readily soluble or dispensible in fresh water.

9. A terpolymer according to claim 1 wherein said terpolymer possesses enhanced drag reduction efficiency in acid, base, or salt solutions as compared to homogeneously charged copolymers.

10. A terpolymer according to claim 1 wherein said terpolymer is derived from water soluble nonionic, anionic and cationic monomers.

11. The use of terpolymers of claim 1 as drag reducing agents employed in aqueous salt solutions at polymer levels from about 20 to about 1000 ppm.

12. The use of terpolymers of claim 1 as drag reducing agents employed in multicomponent salt solutions, e.g., well control and workover fluids, blood and the like, at polymer levels from about 20 to about 1000 ppm.

* * * * *